United States Patent
Reese et al.

(10) Patent No.: US 8,953,736 B2
(45) Date of Patent: Feb. 10, 2015

(54) EXPOSURE BOOST ZONE FOR BOILING WATER REACTOR NUCLEAR BUNDLES

(75) Inventors: Anthony P. Reese, Wilmington, NC (US); Lukas Trosman, Wilmington, NC (US); Gerald Dean Kvaall, Jr., Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 771 days.

(21) Appl. No.: 12/756,236

(22) Filed: Apr. 8, 2010

(65) Prior Publication Data

US 2011/0249785 A1  Oct. 13, 2011

(51) Int. Cl.
*G21C 3/32* (2006.01)
*G21C 3/326* (2006.01)
*G21D 3/00* (2006.01)

(52) U.S. Cl.
CPC ............... *G21C 3/32* (2013.01); *G21C 3/326* (2013.01); *G21C 2003/3267* (2013.01); *G21D 2003/002* (2013.01); *Y02E 30/31* (2013.01); *Y02E 30/38* (2013.01)
USPC .......................................... 376/419; 376/434

(58) Field of Classification Search
USPC ................................................ 376/419, 434
See application file for complete search history.

(56) References Cited

U.S. PATENT DOCUMENTS

| 4,629,599 | A | * | 12/1986 | Crowther et al. | 376/212 |
| 4,631,166 | A | * | 12/1986 | Camden, Jr. | 376/435 |
| 5,008,070 | A | * | 4/1991 | Aoyama et al. | 376/419 |
| 5,198,186 | A | * | 3/1993 | Ogiya et al. | 376/435 |
| 5,377,247 | A | * | 12/1994 | Yoshioka et al. | 376/428 |
| 5,544,211 | A | * | 8/1996 | Haikawa et al. | 376/435 |
| 6,005,905 | A | * | 12/1999 | Yamanaka et al. | 376/267 |
| 2008/0089461 | A1 | * | 4/2008 | Earl et al. | 376/239 |

FOREIGN PATENT DOCUMENTS

| EP | 2088600 A1 | 8/2009 |
| JP | 63-021589 | 1/1988 |
| JP | 01-153996 | 6/1989 |
| JP | 10-170674 | 6/1998 |
| JP | 2007-139615 A | 6/2007 |

OTHER PUBLICATIONS

Japanese Office Action dated Nov. 26, 2013, issued in Japanese Application No. 2011-082341.
Extended European Search Report dated Jun. 27, 2014 and issued in corresponding European Patent Application No. 11161548.0.

* cited by examiner

*Primary Examiner* — Jack W Keith
*Assistant Examiner* — Kimberly E Coghill
(74) *Attorney, Agent, or Firm* — Harness, Dickey & Pierce, P.L.C.

(57) ABSTRACT

Disclosed are a fuel rod and a fuel bundle using the fuel rod. The fuel rod may include first enriched uranium in a boost zone of the fuel rod, wherein the boost zone may be arranged directly at a bottom of the fuel rod. The fuel rod may also include second enriched uranium in a second zone of the fuel rod, wherein the second zone is arranged over the boost zone. The fuel rod may also include natural uranium in a third zone of the fuel rod, wherein the third zone is arranged over the second zone. In this fuel rod, a percent of enrichment of the enriched uranium in the boost zone is at least one percent.

14 Claims, 10 Drawing Sheets

|   | A | B | C | D | E | F | G | H | J | K |
|---|---|---|---|---|---|---|---|---|---|---|
| 1 | F1 | F2 | F3 | F4 | F4 | F4 | F4 | F3 | F2 | F1 |
| 2 | F2 | P1 | G3 | P1 | F4 | F4 | P1 | G3 | P1 | F2 |
| 3 | F3 | G3 | F4 | F4 | G3 | F4 | F4 | F4 | G3 | F3 |
| 4 | F4 | P1 | F4 | G1 | F4 | WR | | F4 | P1 | F4 |
| 5 | F4 | F4 | G3 | F4 | P1 | | | F4 | G2 | F4 |
| 6 | F4 | F4 | F4 | WR | | P1 | F4 | G3 | F4 | F4 |
| 7 | F4 | P1 | F4 | | | F4 | G1 | F4 | P1 | F4 |
| 8 | F3 | G3 | F4 | F4 | F4 | G3 | F4 | F4 | G3 | F3 |
| 9 | F2 | P1 | G3 | P1 | G2 | F4 | P1 | G3 | P1 | F2 |
| 10 | F1 | F2 | F3 | F4 | F4 | F4 | F4 | F3 | F2 | F1 |

|   | A  | B  | C  | D  | E  | F  | G  | H  | J  | K  |
|---|----|----|----|----|----|----|----|----|----|----|
| 1 | F1 | F2 | F3 | F4 | F4 | F4 | F4 | F3 | F2 | F1 |
| 2 | F2 | P1 | G3 | P1 | F4 | F4 | P1 | G3 | P1 | F2 |
| 3 | F3 | G3 | F4 | F4 | G3 | F4 | F4 | F4 | G3 | F3 |
| 4 | F4 | P1 | F4 | G1 | F4 | WR | WR | F4 | P1 | F4 |
| 5 | F4 | F4 | G3 | F4 | P1 | WR | WR | F4 | G2 | F4 |
| 6 | F4 | F4 | F4 | WR | WR | P1 | F4 | G3 | F4 | F4 |
| 7 | F4 | P1 | F4 | WR | WR | F4 | G1 | F4 | P1 | F4 |
| 8 | F3 | G3 | F4 | F4 | F4 | G3 | F4 | F4 | G3 | F3 |
| 9 | F2 | P1 | G3 | P1 | G2 | F4 | P1 | G3 | P1 | F2 |
| 10| F1 | F2 | F3 | F4 | F4 | F4 | F4 | F3 | F2 | F1 |

Batch Size = 384    Batch Fraction = 48.0%

Core Size: 800
Fresh Batch: 384
Once Burn: 384
Twice Burn: 32
Periphery size: 92

FIG. 10

Batch Size = 356    Batch Fraction = 44.5%

Core Size: 800
Fresh Batch: 356
Once Burn: 356
Twice Burn: 98
Periphery size: 92

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | | | | | | | | | | | 2 | 2 |
| 2 | | | | | | | | | | 2 | 2 | 2 | 2 | 2 | 1 | 1 |
| 3 | | | | | | | | | 2 | 1 | 1 | 1 | 1 | 1 | 1 | 0 |
| 4 | | | | | | | | 2 | 2 | 2 | 1 | 1 | 0 | 1 | 0 | 1 |
| 5 | | | | | 1 | 1 | 1 | 0 | 0 | 0 | 0 | 0 | 0 | 0 | 0 | 0 |
| 6 | | | | | 2 | 1 | 1 | 0 | 0 | 0 | 1 | 0 | 1 | 0 | 1 | 0 |
| 7 | | | | | | 2 | 1 | 0 | 0 | 0 | 1 | 0 | 1 | 0 | 1 | 0 |
| 8 | | | | | | | 2 | 2 | 0 | 0 | 0 | 1 | 0 | 1 | 0 | 1 |
| 9 | | | | | | | | 2 | 1 | 0 | 0 | 1 | 0 | 1 | 0 | 1 |
| 10 | | | | | | | | | 2 | 1 | 1 | 0 | 1 | 0 | 1 | 0 |
| 11 | | | | | | | | | | 2 | 1 | 0 | 0 | 1 | 0 | 1 |
| 12 | | | | | | | | | | | 2 | 1 | 0 | 1 | 0 | 1 |
| 13 | | | | | | | | | | | | 2 | 1 | 1 | 0 | 0 |
| 14 | | | | | | | | | | | | | 2 | 1 | 1 | 0 |
| 15 | | | | | | | | | | | | | | 2 | 1 | 1 |
| 16 | | | | | | | | | | | | | | | 2 | 1 |

EXPOSURE BOOST ZONE FOR BOILING
WATER REACTOR NUCLEAR BUNDLES

BACKGROUND

1. Field

The invention relates to a nuclear fuel rod including a boost zone and a fuel bundle assembly including the nuclear fuel rod.

2. Description of the Related Art

Figure 1:
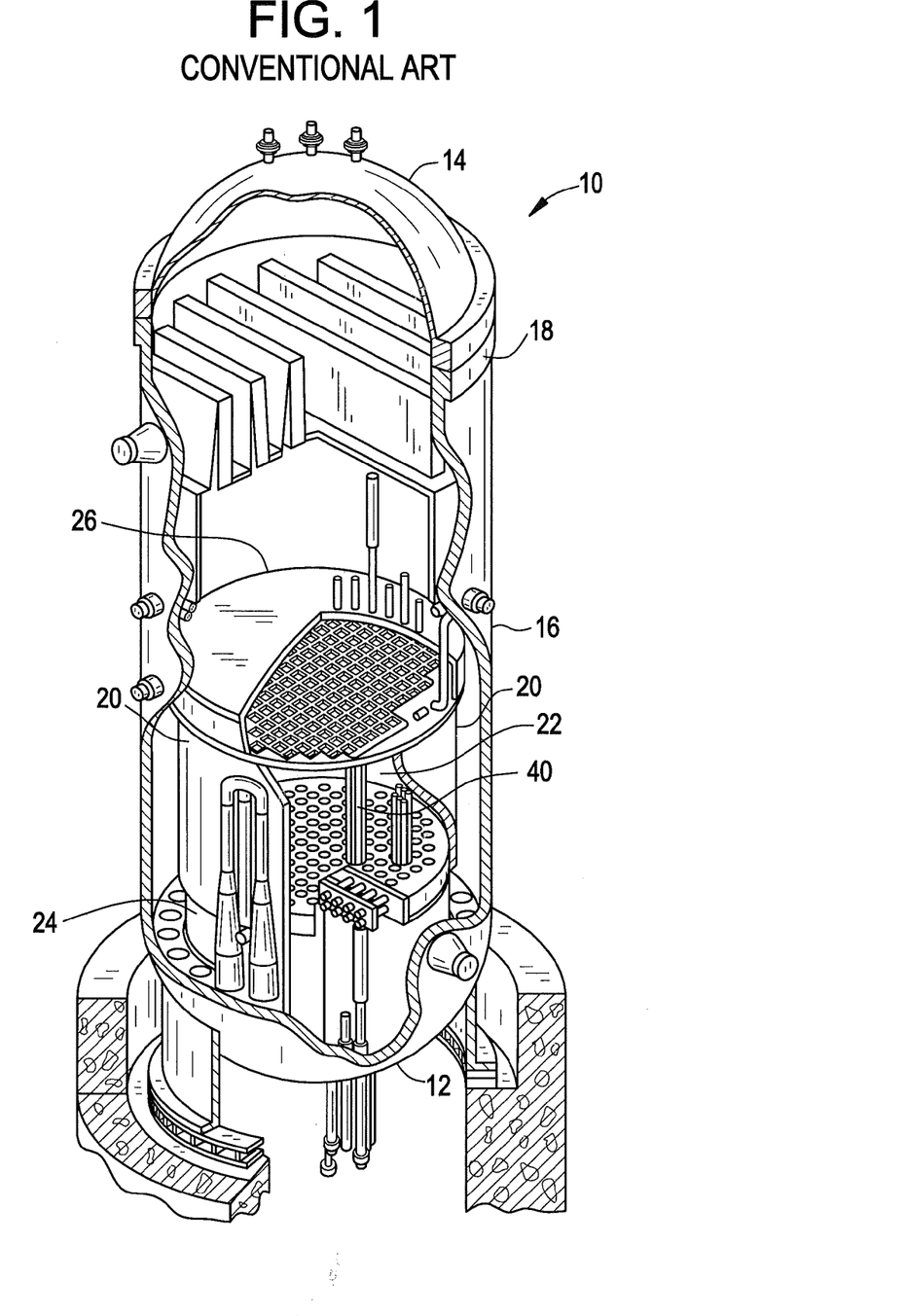
FIG. 1 is a view of a conventional reactor pressure vessel with sections removed for clarity.

Referring to FIG. 1, a conventional operating environment for fuel rods and fuel assemblies is illustrated in the sectional view, with parts cut away, of a boiling water nuclear reactor pressure vessel (RPV) 10 for clarity. The reactor pressure vessel 10 has a generally cylindrical shape and is closed at one end by a bottom head 12 and at its other end by a removable top head 14. A side wall 16 extends from the bottom head 12 to the top head 14. The side wall 16 includes a top flange 18 on which the top head 14 is attached. A cylindrically shaped core shroud 20 surrounds a reactor core 22. The shroud 20 is supported at one end by a shroud support 24 and includes an opposed removable shroud head 26. Heat is generated within the core 22, which includes fuel bundles 40. The fuel bundles 40 include a plurality of fuel rods having fissionable material. For example, a conventional fuel bundle 40 may include a 10×10 matrix of fuel rods.

Figure 2:
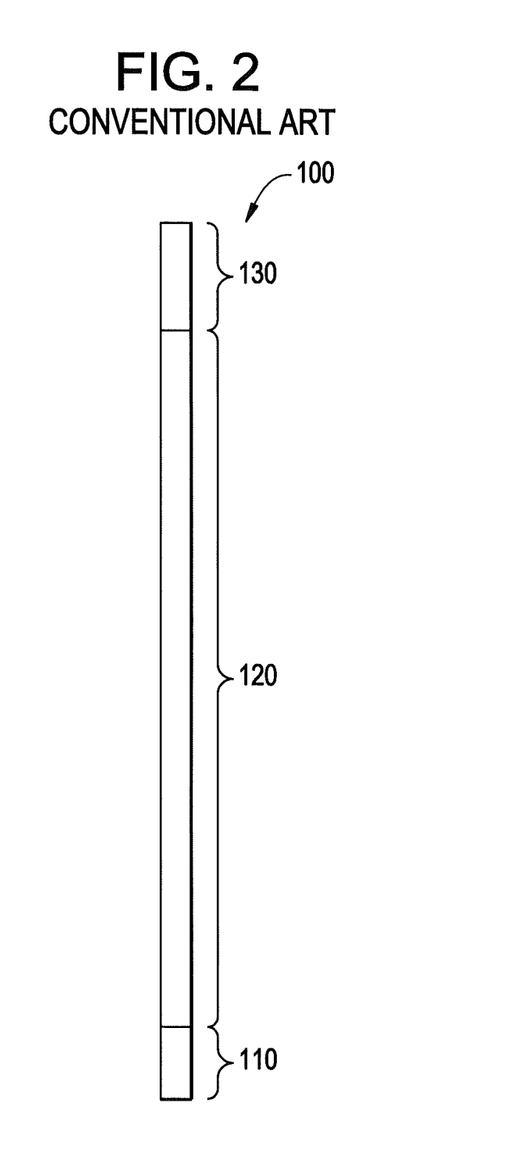
FIG. 2 is a view of a conventional fuel rod.

A conventional fuel rod 100, as illustrated in FIG. 2, may have a length of about 150 inches but may have lengths of about 120 inches, 133 inches, 138 inches, 139 inches, and 145 inches. The conventional fuel rod 100 is filled with sintered pellets of nuclear fuel, for example, natural and/or enriched uranium. The nuclear fuel may be arranged within the conventional fuel rod so that different regions (zones) within the fuel rod 100 include sintered pellets having different enrichments.

The conventional nuclear fuel rod illustrated in FIG. 2 includes three different zones 110, 120, and 130. The first and third zones 110 and 130 span approximately the first and last six inches of the fuel rod and include natural uranium having 0.71% U235 by weight whereas the second zone 120 includes enriched uranium having, for example, 2.4% U235 by weight. Although the conventional fuel rod illustrated in FIG. 2 includes a second zone 120 having an enrichment of 2.4%, those skilled in the art would readily understand that the second zone 120 of the conventional fuel rod 100 may include uranium enriched up to 5% U235 by weight.

It is well known that reactor cores are loaded with excess fuel and thus excess reactivity in order to maintain power through power cycles extending several months. In order to compensate for this, burnable poisons are incorporated in the fuel bundles along with the fuel rods. A burnable poison is a neutron absorber, which is converted by neutron absorption into a material of lesser neutron absorbing capability. A well known burnable poison is gadolinium, normally in the form of gadolinia. It is also known that power distribution within the reactor core is skewed toward the lower regions of the core. In order to compensate for this, the burnable poisons are incorporated in the fuel bundles along with the fuel rods in the lower regions of the core.

Figure 3:
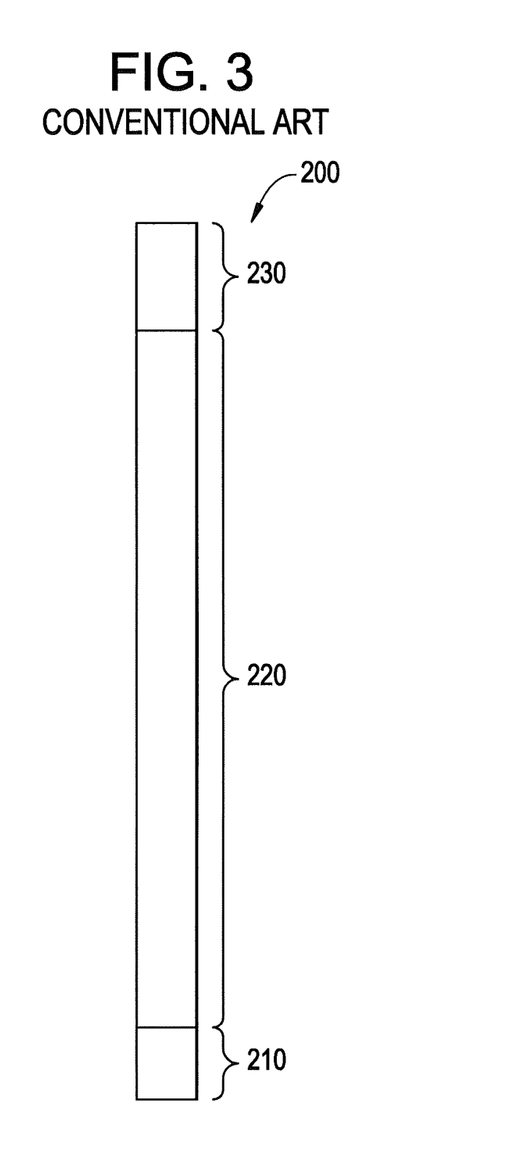
FIG. 3 is a view of a conventional fuel rod that contains gadolinia.

FIG. 3 illustrates a conventional rod 200 containing gadolinia. Like the conventional fuel rod 100 illustrated in FIG. 2, the rod 200 also includes three zones 210, 220, and 230. Like the conventional rod 100, the first and third zones 210 and 230 of the rod 200 include natural uranium. However, the second zone 220 may be either partially or completely filled with enriched uranium containing gadolinia. In the event the second zone 220 is partially filled with gadolinia the remainder of the second zone 220 is filled with enriched uranium.

Figure 4:
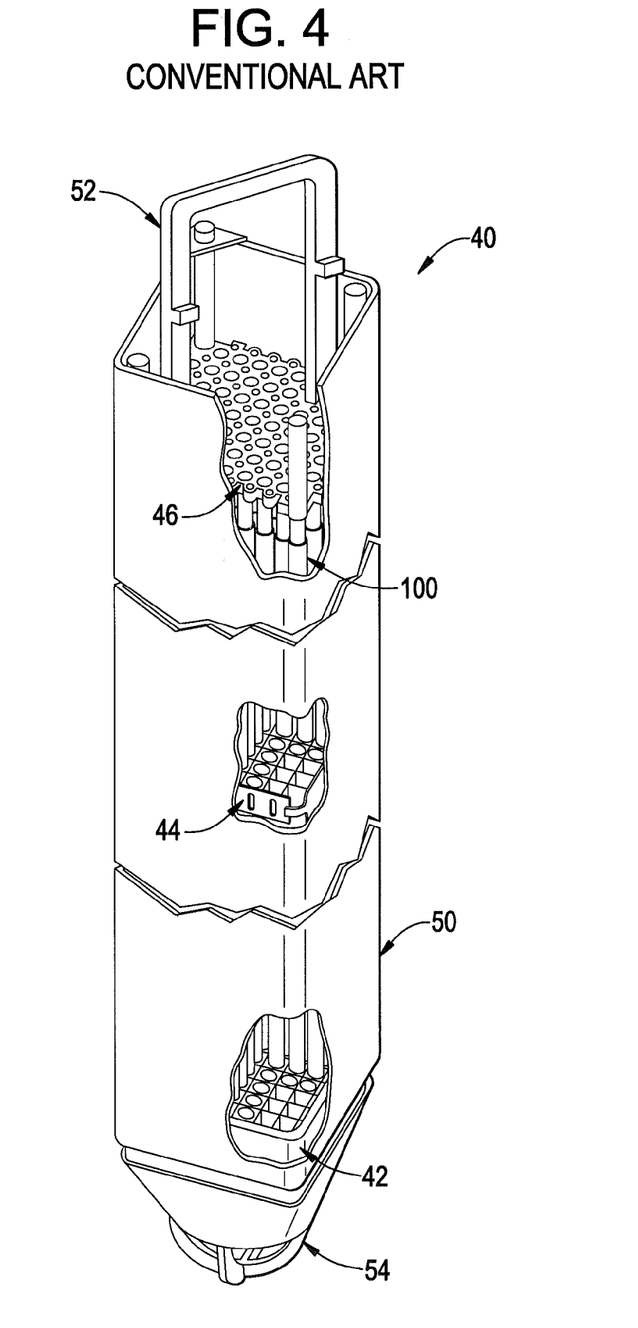
FIG. 4 is a view of a conventional fuel bundle.

FIG. 4 is an example of a conventional fuel bundle 40. As shown in FIG. 4, the fuel bundle 40 encloses a plurality of fuel rods 100. The fuel rods 100 within the fuel bundle 40 are supported at a lower end by a lower tie plate 42, in the middle by a interim spacer 44, and at the top by an upper tie plate 46. The fuel bundle 40 also includes a fuel channel 50, which encloses the plurality of fuel rods 100, and a bail handle 52 for transporting the fuel bundle 40. At the bottom of the fuel bundle 40 is a nosepiece 54 which allows a coolant to flow into and through the fuel bundle 40. In addition to fuel rods 100, the conventional fuel bundle 40 typically includes water rods near the center of the fuel bundle 40 that allow the coolant to flow through for neutron moderation. The conventional fuel bundle 40 also includes rods 200 containing gadolinia.

Figure 5A:
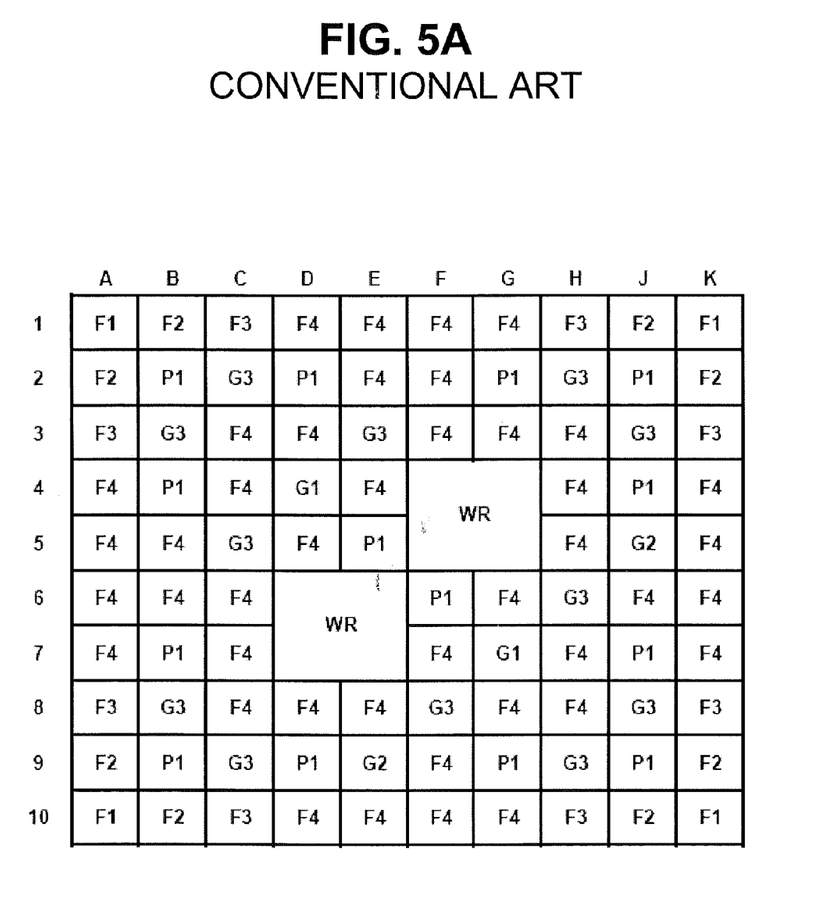
FIG. 5A is a cross-section of a conventional fuel bundle.
Figure 5B:
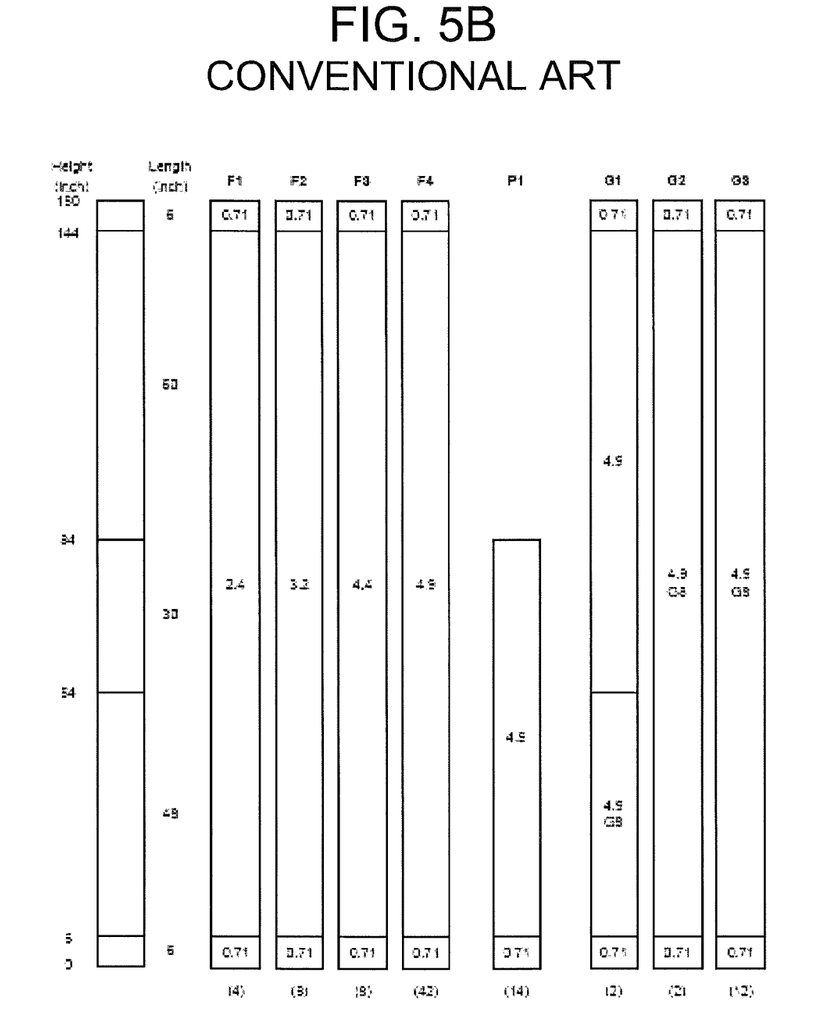
FIG. 5B illustrates various profile of the rods included in the conventional fuel bundle illustrated in FIG. 5A.

FIG. 5A illustrates a cross-section of a fuel bundle 40 which includes an array of conventional fuel rods (F1, F2, F3, F4 and P1), an array of fuel rods containing gadolinia (G1, G2, and G3), and two water rods. The profiles of each of the fuel rods and the water rods in the fuel bundle 40 as illustrated in FIG. 5A are provided in FIG. 5B. For example, the F1 fuel rod, as illustrated in the FIG. 5A at grid point A-1 (and illustrated in FIG. 5B), includes a natural uranium blanket corresponding to the first zone 110 of the conventional fuel rod 100 illustrated in FIG. 2. In FIGS. 5A and 5B, the aforementioned blanket occupies the bottom six inches of the fuel rod F1 (i.e. bottom six inches includes natural uranium having 0.71% U235 by weight). The middle portion of fuel rod F1 (corresponding to the second zone 120 of the conventional fuel rod 100 illustrated in FIG. 2) is about 138 inches long and includes enriched uranium (i.e. uranium including 2.4% U235 by weight). The top six inches of fuel rod F1 (corresponding to the third zone 130 of the conventional fuel rod 100 illustrated in FIG. 2) includes natural uranium having 0.71% U235 by weight. As discussed above, the bottom six inches of each of the fuel rods in the conventional bundle are filled with natural uranium having 0.71% by weight U235.

FIGS. 5A and 5B also illustrate an example of a conventional fuel rod that includes gadolinia. For example, G1 located at grid point D-4 (and having a profile illustrated in FIG. 5B) illustrates a fuel rod having a lower blanket of natural uranium containing, by weight, 0.71% U235. The lower blanket corresponds to the first zone 210 illustrated in FIG. 3. The middle portion of G1 includes fuel containing 4.9% enriched uranium. The middle portion corresponds to the second zone 220 illustrated in FIG. 3. As illustrated, the middle portion of G1 includes a portion which includes 8% gadolinia by weight and a portion that does not include any gadolinia. The top six inches of G1 is filled with natural uranium having 0.71% U235 by weight. This top blanket of natural uranium corresponds to the third zone 230 illustrated in FIG. 3.

SUMMARY

Example embodiments relate to a new fuel rod and a fuel bundle using the fuel rod.

In accordance with an example embodiment of the present invention, a fuel rod may include first enriched uranium in a boost zone of the fuel rod, wherein the boost zone may be arranged directly at a bottom of the fuel rod. The fuel rod may also include second enriched uranium in a second zone of the fuel rod, wherein the second zone is arranged over the boost zone. The fuel rod may also include natural uranium in a third zone of the fuel rod, wherein the third zone is arranged over the second zone. In this example embodiment, a percent of enrichment of the enriched uranium in the boost zone is at least one percent.

In accordance with another example embodiment of the present invention, a fuel bundle may include a first fuel rod. The first fuel rod may include first enriched uranium in a boost zone of the first fuel rod, wherein the boost zone of the first fuel rod is arranged directly at the bottom of the first fuel rod. The fuel rod may also include second enriched uranium in a second zone of the first fuel rod, wherein the second zone of the first fuel rod is arranged over the boost zone of the first fuel rod. The fuel rod may also include natural uranium in a third zone of the first fuel rod, wherein the third zone of the first fuel rod is arranged over the second zone of the first fuel rod. In this example embodiment, a percent of enrichment of the enriched uranium in the boost zone of the first fuel rod is at least one percent.

BRIEF DESCRIPTION OF THE DRAWINGS

Example embodiments of the present invention will be more clearly understood from the following detailed description taken in conjunction with the accompanying drawings.

DETAILED DESCRIPTION OF THE EXAMPLE EMBODIMENTS

Example embodiments of the invention will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

As discussed above, a conventional fuel rod 100 includes a first zone region 110 and a third zone region 130, each of which are approximately six inches in length, that include natural uranium. The Applicants, however, have discovered that replacing the natural uranium occupying the first zone 110 of a conventional fuel rod 100 with enriched uranium significantly increases the number of cycles a fuel bundle can operate before replacement of the fuel bundle is necessary.

Figure 6:
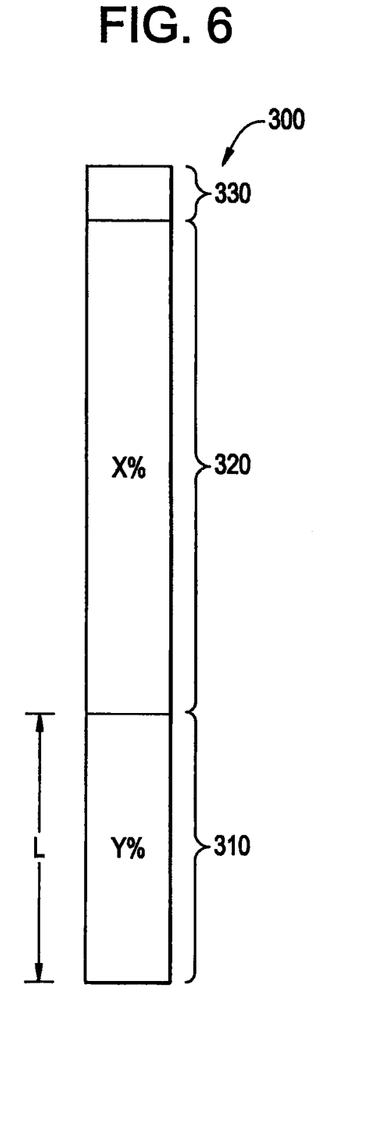
FIG. 6 is a view of a fuel rod according to a first example embodiment of the present invention.

FIG. 6 illustrates a fuel rod 300 in accordance with an example embodiment of the invention. As shown in FIG. 6, the example fuel rod 300 includes a boost zone 310 at the bottom of the fuel rod, a second zone 320, and a third zone 330 at the top of the rod. The second zone 320 may include enriched uranium, for example, uranium having greater than 0.71% U235 by weight. The third zone 330 may be approximately 6 inches long and may be filled with natural uranium. The first zone 310 may also have a length L of six inches, however, example embodiments are not limited thereto, for example the length L of the boost zone 310 may be greater than, equal to, or smaller than six inches.

The boost zone 310, may include enriched uranium that is enriched at least as much as one percent (1% U235 by weight). In FIG. 6, X % represents the percent by weight of U235 in the second zone 320 and Y % represents the percent by weight of U235 in the boost zone 310. In example embodiments Y % is greater than or equal to 1%. For example, if the second zone 320 includes 3% enriched uranium (3% U235 by weight) the boost zone 310 may include uranium having 1% or greater enriched uranium (Y %≥1%). Accordingly, a major difference between the conventional fuel rod 100 illustrated in FIG. 2 and the fuel rod 300 according to this example embodiment is that the fuel rod 300 includes a boost zone 310 including enriched uranium at the bottom of the fuel rod 300 rather than a lower blanket of natural uranium at the bottom of the fuel rod 300.

Figure 7:
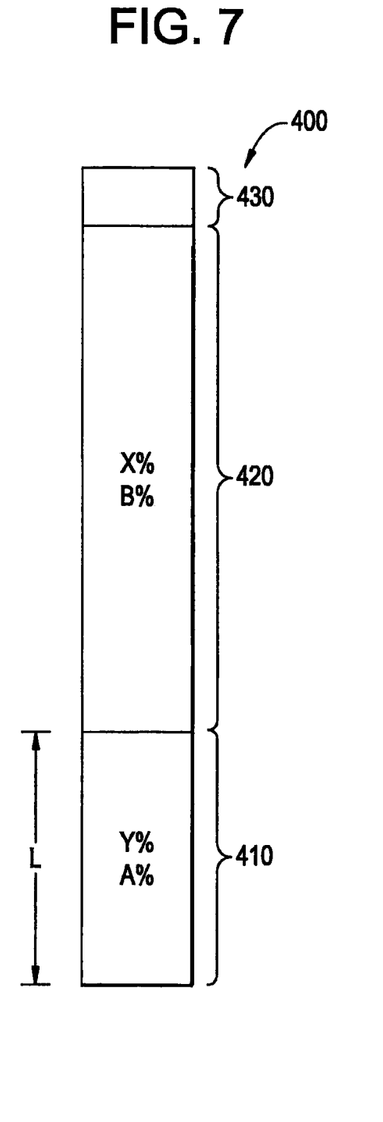
FIG. 7 is a view of a second fuel rod according to a second example embodiment of the present invention.

FIG. 7 illustrates a fuel rod 400 in accordance with another example embodiment. In this example embodiment, the fuel rod 400 includes gadolinia. Like the fuel rod 300 illustrated in FIG. 6, the rod 400 may also include three zones: a boost zone 410, a second zone 420, and third zone 430. The third zone 430 of the rod 400 includes natural uranium and may be approximately six inches long. However, the boost zone 410 and the second zone 420 may include enriched uranium containing gadolinia. In FIG. 7, A % and B % represent the percent of gadolinia present in the boost zone 410 and the second zone 420, respectively, by weight. In FIG. 7, X % represents the percent by weight of U235 in the second zone 420 and Y % represents the percent by weight of U235 in the boost zone 410. In this example embodiment Y % is greater than or equal to 1%. In this example embodiment, the percent weight A % of gadolinia in the boost zone 410 may be lower than, equal to, or greater than the percent weight B % of gadolinia in the second zone 420.

Figure 8A:
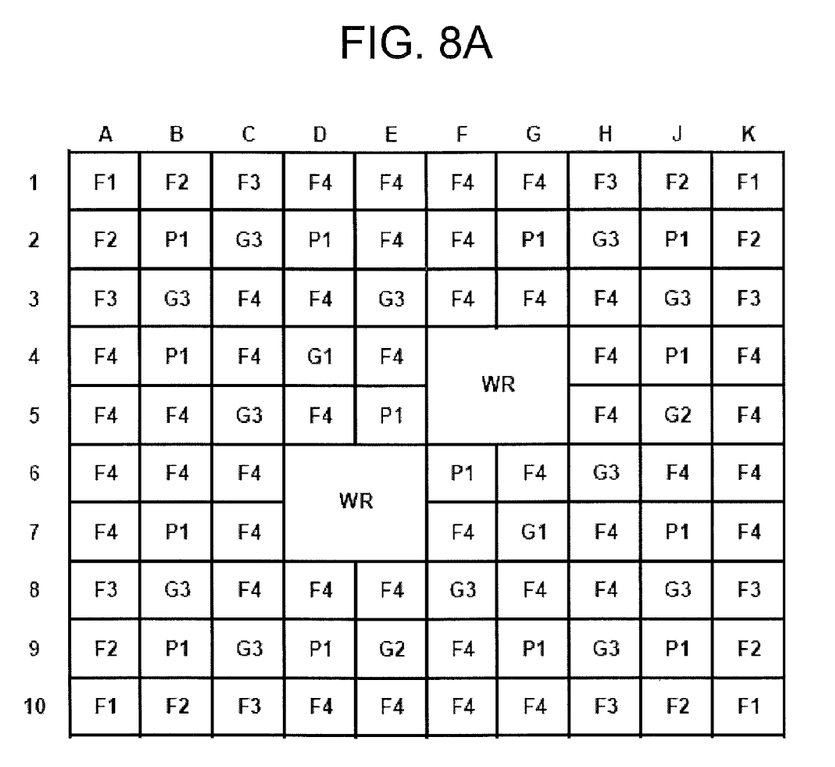
FIG. 8A is a cross-section of a fuel bundle using the fuel rods according to example embodiments.
Figure 8B:
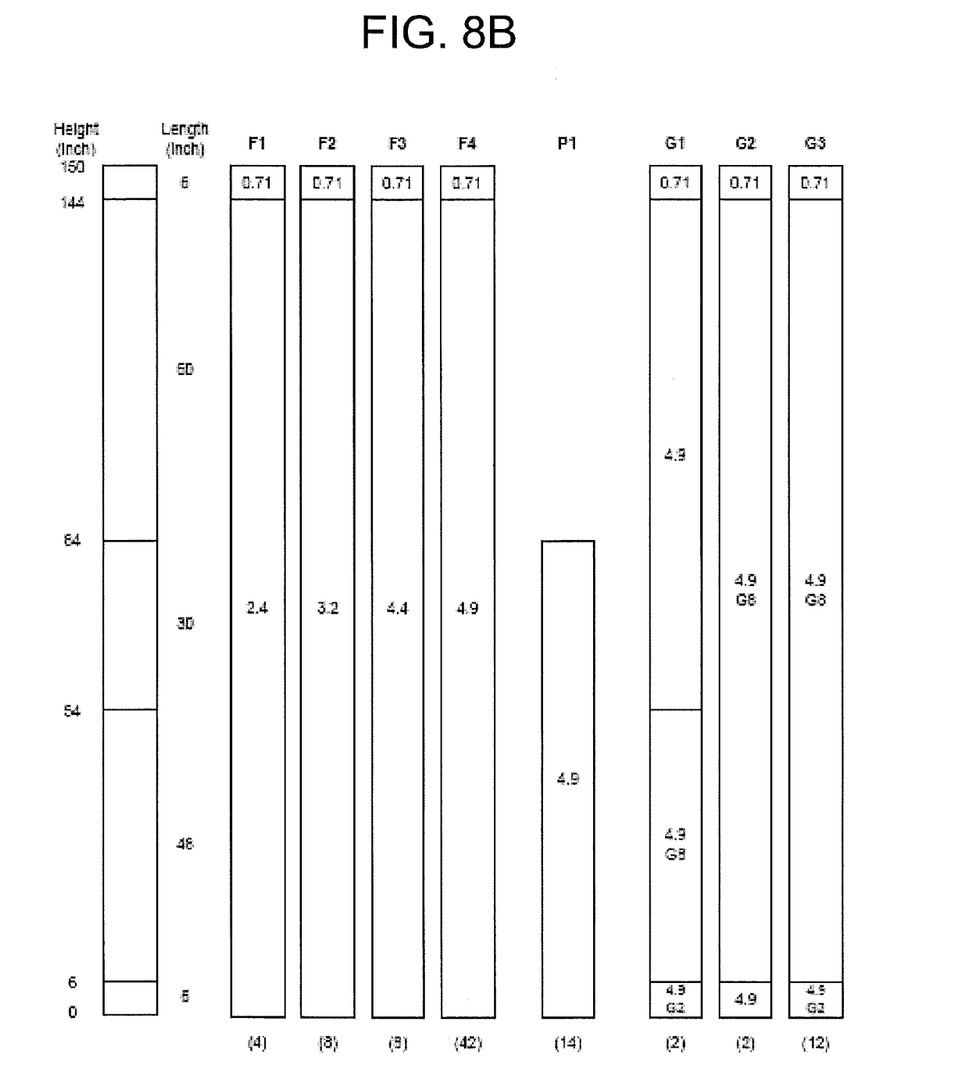
FIG. 8B illustrates various profiles of the rods included in the fuel bundle illustrated in FIG. 8A.

FIG. 8A illustrates a cross-section of a fuel bundle 40' including an array of fuel rods F1-F4 having the configuration of the fuel rod 300 illustrated in FIG. 6 and fuel rods G1-G3 having the configuration of the fuel rod 400 illustrated in FIG. 7 (see FIG. 8A). The fuel bundle 40' also includes water rods WR. The profiles of each of the fuel rods are provided in FIG. 8B. For example, the F1 fuel rod, as illustrated in FIG. 8B, includes enriched uranium (2.4% U235 by weight) spanning nearly the entire length of the fuel rod with the top six inches of the rod being filled with natural uranium having 0.71% U235 by weight. Referring to FIG. 6 and FIG. 8B, the enriched uranium zone of F1 represents both the boost zone 310 and the second zone 320 and further represents an example where X %=Y %=2.4%. Furthermore, the top six inches of fuel rod F1 corresponds to the third zone 330 illustrated in FIG. 6. As another example, the F2 fuel rod, as illustrated in 8B, includes enriched uranium (3.2% U235 by weight) spanning nearly the entire length of the fuel rod with the top six inches of the rod F2 being filled with natural uranium having 0.71% U235 by weight. Referring to FIG. 6, the enriched uranium zone of F2 corresponds to the boost zone 310 and the second zone 320 of the fuel rod 300 and further represents a case where X %=Y %=3.2%. As in the previous example, the top six inches of fuel rod F2 corresponds to the third zone 330 illustrated in FIG. 6.

FIG. 8B also illustrates an example of a fuel rod containing gadolinia as illustrated in FIG. 7. For example, G1 illustrates a fuel rod having three zones. The first zone occupies the bottom six inches of the fuel rod and includes enriched uranium having 4.9% U235 by weight. This zone corresponds to the boost zone 410 illustrated in FIG. 7. However, the bottom six inches of the fuel rod G1 also includes 2% gadolinia by weight. The next one hundred and thirty-eight inches of the fuel rod G1 includes enriched uranium having 4.9% U235 by weight. However, only the bottom forty-eight inches of this zone includes 8% gadolinia by weight whereas the next ninety inches includes only enriched uranium having 4.9% U235 by weight. The top 6 inches of the fuel rod G1 includes natural uranium. As one skilled in the art would recognize, fuel rod G1 represents a case where X %=Y %=4.9%, A %=2%, and B=8%.

As another example of a fuel rod including gadolinia, fuel rod G3 includes a first zone containing enriched uranium (4.9% U235 by weight) spanning approximately the first bottom six inches of the fuel rod. This zone also includes approximately 2% gadolinia by weight. The next one hundred and thirty-eight inches of the rod include enriched uranium (4.9% U235 by weight) having 8% by weight gadolinia. The top six inches of fuel rod G3 includes only natural uranium. As one skilled in the art would recognize, fuel rod G3 represents a case where X %=Y % 4.9%, A %=2%, and B %=8%.

As yet another example of a fuel rod including gadolinia, fuel rod G2 includes a first zone containing enriched uranium (4.9% U235 by weight) spanning approximately the first bottom six inches of the fuel rod. This zone includes only enriched uranium unlike the corresponding zones of fuel rods G1 and G3. The next one hundred and thirty-eight inches of fuel rod G2 include enriched uranium (4.9% U235 by weight) having 8% by weight gadolinia. The top six inches of fuel rod G2 includes only natural uranium. As one skilled in the art would recognize, fuel rod G2 represents a case where X %=Y %=4.9%, A %=0%, and B %=8%.

Figure 9:
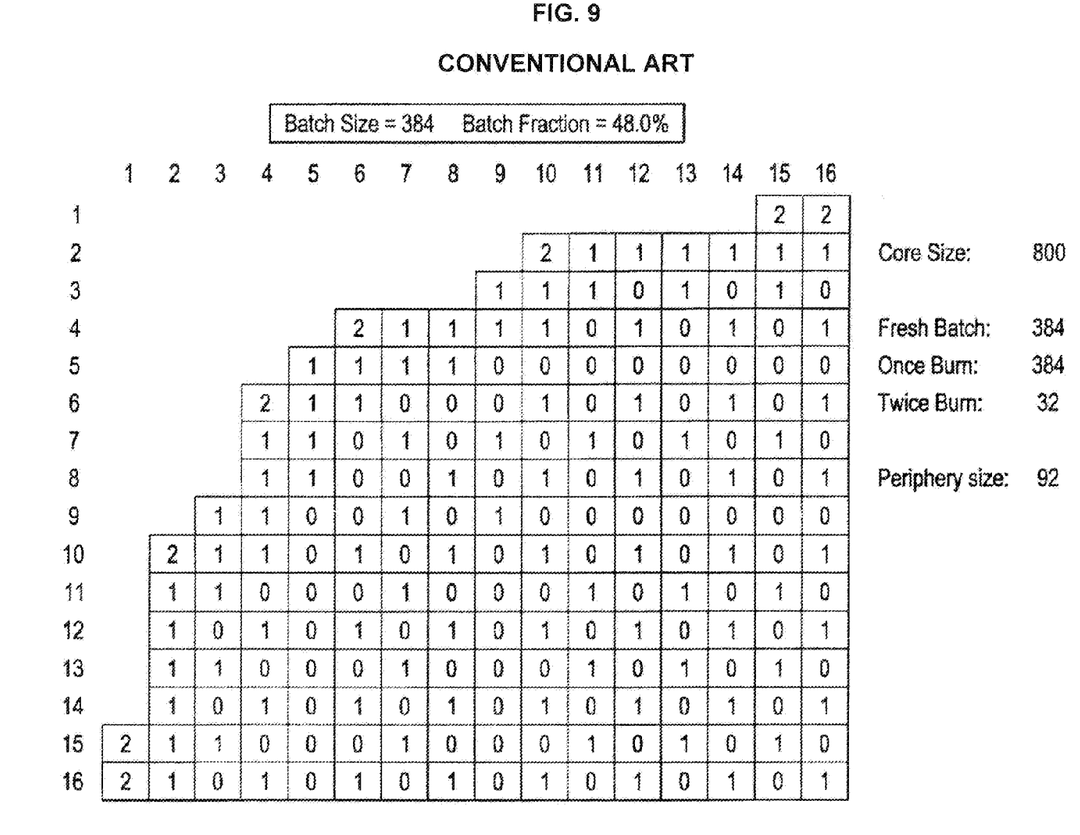
FIG. 9 illustrates results of a core computer simulation using a conventional fuel bundle.
Figure 10:
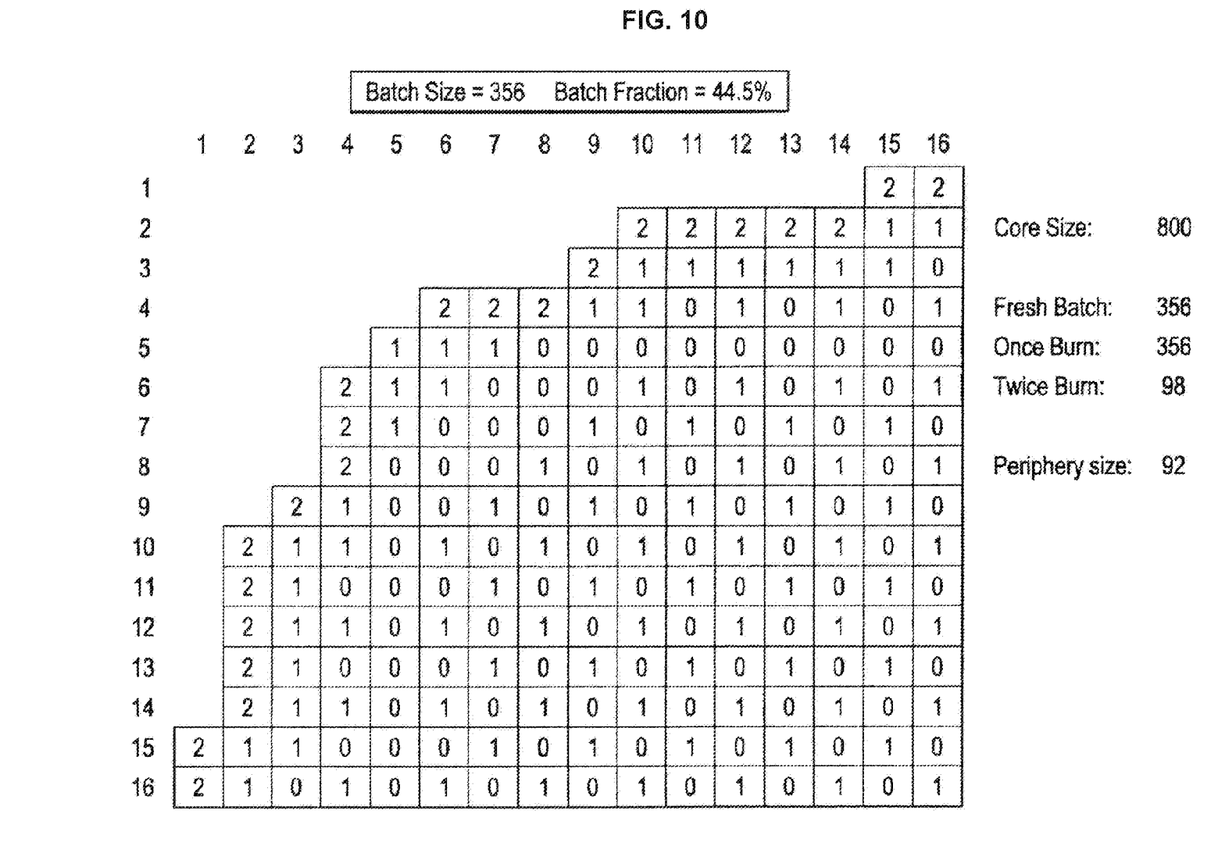
FIG. 10 illustrates results of a core computer simulation using a fuel bundle incorporating the fuel rods according to example embodiments of the present invention.

FIGS. 9 and 10 represent simulation results of a reactor core including 800 fuel bundles. Due to symmetry, only a quarter of the core was modeled. More specifically, FIGS. 9 and 10 represent an equilibrium cycle of the reactor core using the conventional and newly developed fuel and bundle rod design. For example, FIG. 9 represents the equilibrium cycle of a core utilizing the fuel bundle 40 illustrated in FIGS. 5A and 5B and FIG. 10 represents the equilibrium cycle of a core utilizing the fuel rod designs 300 and 400 and the bundle 40' according to example embodiments.

As can be seen in FIG. 9, when conventional bundles 40 are used in the reactor core, the number of fresh bundles (identified by the character "0" in the grid), once burned bundles (depicted by the character "1" in the grid), and twice burned bundles (depicted by the character "2" in the grid) in the equilibrium cycle are 384, 384, and 32, respectively. However, when the core is loaded with fuel bundles 40' (see FIG. 10), in accordance with example embodiments, the number of fresh bundles, once burned bundles, and twice burned bundles are 356, 356, and 98, respectively. In short, the number of twice burned bundles increases by approximately 175% and the number of fresh bundles and once burned bundles decrease by 7% when using the fuel bundle design 40' according to example embodiments rather than the conventional fuel bundle 40. These results indicate that the newly developed fuel bundle design 40' using the newly developed fuel rods 300 and 400 offer a significant improvement over the conventional art.

In short, removing the natural uranium blankets at the bottom of the bundle allows the batch size (the number of fresh fuel bundles) to be decreased to the extent that a net gain in efficiency is realized. It is not obvious that this should be so and is, in fact, counter-intuitive. One skilled in the art would expect that placing a large quantity of high value, high reactivity uranium directly on the bottom of the core where neutron leakage is highest should result in a loss of efficiency. However, after thorough investigation, the efficiency loss of removing the bottom blanket is more than offset by the efficiency gain of the resulting decrease in batch size.

While example embodiments have been particularly shown and described with reference to example embodiments thereof, it will be understood by those of ordinary skill in the art that various changes in form and details may be made therein without departing from the spirit and scope of the following claims.

What is claimed:

1. A fuel bundle comprising:
a first fuel rod, the first fuel rod including
first enriched uranium in a boost zone of the first fuel rod, the boost zone having a first average composition, the boost zone of the first fuel rod including a first burnable poison and constituting a bottommost portion of the first fuel rod, a percent of enrichment of the first enriched uranium in the boost zone of the first fuel rod being at least one percent,
second enriched uranium in a second zone of the first fuel rod, the second zone having a second average composition, the second zone of the first fuel rod being arranged over the boost zone of the first fuel rod, the second average composition of the second zone being different from the first average composition of the boost zone, and
natural uranium in a third zone of the first fuel rod, the third zone having a third average composition, the third zone of the first fuel rod being arranged directly over the second zone of the first fuel rod, a length of the boost zone being equal to a length of the third zone, the third average composition of the third zone being different from the first average composition of the boost zone and the second average composition of the second zone.

2. The fuel bundle according to claim 1, further comprising:
a second fuel rod, the second fuel rod including
third enriched uranium in a boost zone of the second fuel rod, the boost zone of the second fuel rod being arranged directly at a bottom of the second fuel rod,
fourth enriched uranium in a second zone of the second fuel rod, the second zone of the second fuel rod being arranged over the boost zone of the second fuel rod, and
natural uranium in a third zone of the second fuel rod, the third zone of the second fuel rod being arranged over the second zone of the second fuel rod, wherein a percent of enrichment of the third enriched uranium in the boost zone of the second fuel rod is equal to or greater than a percent of enrichment of the fourth enriched uranium in the second zone of the second fuel rod, and at least one of the boost and second zones of the second fuel rod includes a second burnable poison.

3. The fuel bundle according to claim 2, wherein the second burnable poison is gadolinia.

4. The fuel bundle according to claim 2, wherein the third zones of the first and second fuel rods have a length of about six inches.

5. The fuel bundle according to claim 2, wherein the second zones of the first and second fuel rods are directly on the boost zones of the first and second fuel rods.

6. The fuel bundle according to claim 2, wherein the boost zone of the second fuel rod does not include the second burnable poison.

7. The fuel bundle according to claim 2, wherein the boost zone and the second zone of the second fuel rod include the second burnable poison.

8. The fuel bundle according to claim 7, wherein a percent by weight of the second burnable poison in the boost zone is less than a percent by weight of the second burnable poison in the second zone.

9. The fuel bundle according to claim 2, wherein the first and second fuel rods are configured to yield a batch fraction of about 48% in a reactor core.

10. The fuel bundle according to claim 1, wherein the percent of enrichment of the first enriched uranium in the boost zone of the first fuel rod is about one percent.

11. The fuel bundle according to claim 1, wherein the percent of enrichment of the first enriched uranium in the boost zone of the first fuel rod is less than a percent of enrichment of the second enriched uranium in the second zone of the first fuel rod.

12. The fuel bundle according to claim 1, wherein the second zone has an enrichment that is greater than that of the boost zone.

13. The fuel bundle according to claim 1, wherein the length of the boost zone is about six inches.

14. The fuel bundle according to claim 1, wherein the first burnable poison is gadolinia.

* * * * *